United States Patent Office 2,856,293
Patented Oct. 14, 1958

2,856,293

STABILIZATION OF FATTY MATERIALS

Joseph A. Chenicek, Bensenville, Ill., assignor to Universal Oil Products Company, Des Plaines, Ill., a corporation of Delaware No Drawing. Application November 30, 1954
Serial No. 472,209

18 Claims. (Cl. 99—163)

This invention relates to the stabilization of fatty materials and more particularly to a novel method of inhibiting the development of rancidity therein. This application is a continuation-in-part of my copending application Serial No. 392,469, filed November 16, 1953, which is now abandoned, as a continuation-in-part of my earlier application Serial No. 176,531, filed July 28, 1950, now Patent No. 2,686,719, August 17, 1954. The fatty materials which may be stabilized in accordance with the present invention generally are of animal, marine or vegetable origin. Merely as typical representatives, the following edible fats and oils are mentioned: linseed oil, menhaden oil, cotton seed oil, castor oil, rapeseed oil, coconut oil, peanut oil, corn oil, sesame oil, palm oil, babassu oil, butter, fat, lard, beef tallow, etc., as well as hydrogenated oil and fats which are sold under various trade names. It is understood that other oils and fats may be treated within the scope of the present invention, including fats and oils which previously have been subjected to various treatments, such as blowing with air, heat treatment, etc.

In addition, the present invention may be employed for the treatment of solid food products including, for example, bellies, sides or slabs of bacon, slabs of ham, sides of beef, as well as similar cuts of sheep, lamb, deer, etc. When used for feed to dogs or other animals, the present invention may be utilized for the treatment of horse meat, etc. Similarly, the present invention may be used for the stabilization of poultry including chickens, ducks, geese, turkeys, etc., marine food including fish, lobster, etc., fruits including oranges, pineapples, bananas, etc., vegetables including egg plant, squash, avocados, etc., dairy products including cheese, dried milk powder, etc., confectioneries and particularly chocolate, butter creams, etc. It is understood that the food products specifically set forth herein are merely typical representatives and that the novel features of the present invention may be utilized for the stabilization of any food product subject to oxidative deterioration. In still another embodiment, the novel inhibitor may be incorporated in material used to package food products, including, for example, wax paper, coated cartons, etc.

In accordance with the present invention, the fatty material or food product is stabilized by the addition thereto of a novel inhibitor. Satisfactory inhibitors for fatty materials must meet certain strict requirements. In the first place, the inhibitor must be potent in order to sufficiently prevent or retard rancidity development. Extensive investigations have shown that there is no prediction of potency in edible fats and oils based upon prior effectiveness in other organic substances. Conversely, inhibitors which are satisfactory for use in edible fats and oils may not be satisfactory for use in other organic substances.

Further, satisfactory inhibitors for fatty materials must be non-toxic, must not impart undesirable color, ordor or taste to the fats and oils, and must not be so volatile that they are removed from the fats and oils during cooking or in deep fat frying. In addition, the inhibitor must be readily soluble in edible fats and oils in order to be satisfactorily incorporated therein.

In one embodiment, the present invention relates to a method of stabilizing fatty material against rancidity which comprises incorporating therein an N,N'-di-aliphatic-p-phenylene diamine inhibitor in which each aliphatic group contains at least 8 carbon atoms.

In a specific embodiment, the present invention relates to a method of stabilizing lard which comprises adding thereto from about 0.0001% to about 1% by weight of N,N'-di-octyl-p-phenylene diamine.

In another embodiment, the present invention relates to a novel composition of matter comprising a fatty material containing an N,N'-di-aliphatic-p-phenylene diamine in which each aliphatic group contains at least 8 carbon atoms.

As hereinbefore set forth, the inhibitor of the present invention comprises an N,N'-di-aliphatic-p-phenylene diamine in which each of the aliphatic groups contains at least 8 carbon atoms. In a preferred embodiment, each of the aliphatic groups in the N,N'-di-aliphatic-p-phenylene diamine contains from about 8 to about 20 carbon atoms, although in some cases a higher number of carbon atoms in each of the aliphatic groups may be employed. Generally it will be unnecessary to exceed about 30 carbon atoms in each of the aliphatic groups. Preferred additives comprise N,N'-di-alkyl-p-phenylene diamines including N,N'-di-octyl-p-phenylene diamine, N,N'-di-nonyl-p-phenylene diamine, N,N'-di-decyl-p-phenylene diamine, N,N'-di-undecyl-p-phenylene diamine, N,N'-di-dodecyl-p-phenylene diamine, N,N'-di-tridecyl-p-phenylene diamine, N,N'-di-tetradecyl-p-phenylene diamine, N,N'-di-pentadecyl-p-phenylene diamine, N,N'-di-hexadecyl-p-phenylene diamine, N,N'-di-heptadecyl-p-phenylene diamine, N,N'-di-octadecyl-p-phenylene diamine, N,N'-di-nonadecyl-p-phenylene diamine, N,N'-di-eicosyl-p-phenylene diamine, etc.

Particularly preferred inhibitors comprise those in which the alkyl substituents are attached to the nitrogen atom on a non-terminal carbon atom and still more particularly comprise a secondary alkyl configuration. Specifically preferred inhibitors thus include N,N'-di-3-(5-methylheptyl)-p-phenylene diamine, N,N'-di-4-(2,6-dimethyl-heptyl)-p-phenylene diamine, N,N'-di-2-octyl-p-phenylene diamine, N,N'-di-3-octyl-p-phenylene diamine, N,N'-di-4-octyl-p-phenylene diamine, N,N'-di-2-nonyl-p-phenylene diamine, N,N'-di-3-nonyl-p-phenylene diamine, N,N'-di-4-nonyl-p-phenylene diamine, N,N'-di-2-decyl-p-phenylene diamine, N,N'-di-3-decyl-p-phenylene diamine, N,N'-di-4-decyl-p-phenylene diamine, N,N'-di-5-decyl-p-phenylene diamine, N,N'-di-2-undecyl-p-phenylene diamine, N,N'-di-3-undecyl-p-phenylene diamine, N,N'-di-4-undecyl-p-phenylene diamine, N,N'-di-5-undecyl-p-phenylene diamine, N,N'-di-2-dodecyl-p-phenylene diamine, N,N'-di-3-dodecyl-p-phenylene diamine, N,N'-di-4-dodecyl-p-phenylene diamine, N,N'-di-5-dodecyl-p-phenylene diamine, etc. Other preferred inhibitors include N,N'-di-2-(5-methylheptyl)-p-phenylene diamine, N,N'-di-2-(6-methyloctyl)-p-phenylene diamine, N,N'-di-2-(7-methylnonyl)-p-phenylene diamine, N,N'-di-2-(4-decyl)-p-phenylene diamine, N,N'-di-2-(4,8-dimethyldecyl)-p-phenylene diamine, N,N'-di-2-(5,10-dimethylundecyl)-p-phenylene diamine, N,N'-di-2-(4-methyldodecyl)-p-phenylene diamine, N,N'-di-2-(4,9-dimethyldodecyl)-p-phenylene diamine, N,N'-di-2-(4,7,10-trimethyl-dodecyl)-p-phenylene diamine, N,N'-di-3-(5-methyloctyl)-p-phenylene diamine, N,N'-di-3-(5,7-dimethyl-octyl)-p-phenylene diamine, N,N'-di-3-(7-methylnonyl)-p-phenylene diamine, N,N'-di-3-(5,9-dimethyldecyl)-p-phenylene diamine, N,N'-di-3-(6-ethyldecyl)-p-phenylene diamine, N,N'-di-3-(6,9-diethyl-undecyl)-p- phenylene diamine, N,N'-di-3-(6-methyldodecyl)-p-phenylene diamine, N,N'-di-3-(10-ethyl-dodecyl)-p-phenylene diamine, N,N'-di-3-(5-ethyl-11-methyl-dodecyl)-p-phenylene diamine, etc.

In some cases, the inhibitor may contain two different alkyl groups, each containing at least 8 carbon atoms. Compounds in this class may comprise, for example, N-octyl-N'-nonyl-p-phenylene diamine, N-octyl-N'-decyl-p-phenylene diamine, N-octyl-N'-undecyl-p-phenylene diamine, N-octyl-N'-dodecyl-p-phenylene diamine, etc., N-nonyl-N'-decyl-p-phenylene diamine, N-nonyl-N'-undecyl-p-phenylene diamine, N-nonyl-N'-dodecyl-p-phenylene diamine, N-nonyl-N'-tridecyl-p-phenylene diamine, N-nonyl-N'-pentadecyl-p-phenylene diamine, etc., N-decyl-N'-undecyl-p-phenylene diamine, N-decyl-N'-dodecyl-p-phenylene diamine, N-decyl-N'-tridecyl-p-phenylene diamine, N-decyl-N'-pentadecyl-p-phenylene diamine, etc.

It will be noted that a large number of additive compounds may be prepared and used within the broad scope of the present invention. However, all of these compounds are not necessarily equivalent in their activity.

The additive compounds of the present invention may be prepared in any suitable manner. A particularly preferred method for preparing these compounds is by the reductive alkylation of p-nitroaniline or p-phenylene diamine with an aldehyde and preferably a ketone. A preferred catalyst for effecting this reaction comprises a mixture of the oxides of chromium, copper and barium, although other suitable catalysts may be employed. Other catalysts include those containing cobalt, nickel, platinum, palladium, molybdenum, etc. In general, the reaction is effected at an elevated temperature of from about 100° to about 250° C. and a hydrogen pressure of from about 3 to about 200 atmospheres.

The inhibitor of the present invention will be used in edible fats and oils and other food products in an amount sufficient to obtain the desired stabilization. In general, the concentration will be within the range of from about 0.0001% to about 1% by weight and more particularly within the range of from about 0.001% to about 0.5% by weight. It is understood that the inhibitor may be used in conjunction with synergists such as citric acid, phosphoric acid, ascorbic acid, etc., and/or with other approved oxidation inhibitors, such as 2-tert-butyl-4-methoxyphenol, 2,6-di-tert-butyl-4-methylphenol, NDGA, propyl gallate, etc. The use of the inhibitor of the present invention along with other inhibitors offers advantages in reducing the total amount of additive required, increasing solubility of the other inhibitors in the edible fats and oils, etc. When desired, the inhibitor of the present invention, alone or in combination with the other additives, may be prepared as a solution in edible oil or other suitable non-toxic solvents.

The inhibitor may be incorporated in the edible fats and oils in any suitable manner. When added to an edible oil or other food product in liquid state, the inhibitor is added thereto, preferably followed by suitable mixing. When the food product is a solid, the inhibitor may be injected therein, sprayed on, etc., or the food product may be soaked, dipped, immersed or suspended in the inhibitor or a solution or emulsion thereof.

The following examples are introduced to illustrate further the novelty and utility of the present invention but not with the intention of unduly limiting the same.

EXAMPLE I

The inhibitor used in this example is N,N'-di-3-(5-methylheptyl)-p-phenylene diamine and was prepared by the reductive alkylation of p-nitroaniline with ethyl amyl ketone. The lard used in this example had a normal stability period of two hours as determined by the "Swift" test. This test is described in detail in the article by A. E. King, H. L. Roschen and W. H. Irwin, which appeared in Oil and Soap, pages 105–109, June 1933, and modified as described in the article by R. W. Reimenschneider, J. Turer and R. M. Spec, which appeared in Oil and Soap, pages 169–171, September 1943. In general, this test comprises bubbling air through a sample of the lard and determining rancidity organoleptically and by peroxide values.

Different concentrations of the inhibitor were added to different samples of the lard, and the stability periods determined. These are reported in the following table:

Table I

| Additive: | Stability period, hours |
|---|---|
| None | 2 |
| 0.01% by weight of N,N'-di-3-(5-methyl-heptyl)-p-phenylene diamine | 78.5 |
| 0.015% by weight of above inhibitor | 116 |
| 0.02% by weight of above inhibitor | 130 |

It will be noted that the inhibitor of the present invention was very effective in increasing the stability period of the lard.

EXAMPLE II 0.03% by weight of N,N'-di-4-(2,6-dimethyl-heptyl)-p-phenylene diamine is incorporated in another sample of the lard described in Example I. When tested by the Swift test, the sample of the lard containing the inhibitor will have a stability period considerably in excess of the sample not containing the inhibitor.

EXAMPLE III

A slab of bacon may be stabilized against rancidity by soaking the same in a 20% solution of N,N'-di-2-tridecyl-p-phenylene diamine in lard oil for a time sufficient to incorporate a stabilizing amount of the inhibitor in the bacon.

EXAMPLE IV

Egg plant may be stabilized against oxidative deterioration by spraying the same with a 30% solution of N,N'-di-3-(5-methyl-heptyl)-p-phenylene diamine in cotton seed oil.

I claim as my invention:

1. A method of stabilizing a food product of animal origin against rancidity which comprises incorporating therein a stabilizing amount of N,N'-di-alkyl-p-phenylene diamine inhibitor in which each alkyl group contains at least 8 carbon atoms.

2. A method of stabilizing a food product of animal origin against rancidity which comprises incorporating therein a stabilizing amounts of N,N'-di-alkyl-p-phenylene diamine inhibitor in which each alkyl group contains from about 8 to about 20 carbon atoms.

3. A method of stabilizing a fatty material of animal origin against rancidity which comprises incorporating therein a stabilizing amount of N,N'-di-alkyl-p-phenylene diamine inhibitor in which each alkyl group contains from about 8 to about 20 carbon atoms.

4. A method of stabilizing lard against rancidity which comprises incorporating therein a stabilizing amount of N,N'-di-3-(5-methylheptyl)-p-phenylene diamine.

5. A method of stabilizing lard against rancidity which comprises incorporating therein a stabilizing amount of N,N'-di-4-(2,6-dimethyl-heptyl)-p-phenylene diamine.

6. A method of stabilizing lard against rancidity which comprises incorporating therein a stabilizing amount of N,N'-di-2-decyl-p-phenylene diamine.

7. A method of stabilizing lard against rancidity which comprises incorporating therein a stabilizing amount of N,N'-di-2-tridecyl-p-phenylene diamine.

8. A method of stabilizing lard against rancidity which comprises incorporating therein a stabilizing amount of an N,N'-di-alkyl-p-phenylene diamine inhibitor having at least 8 carbon atoms in each of its alkyl groups.

9. Food product of animal origin stabilized against rancidity containing a stabilizing amount of an N,N'-di-alkyl-p-phenylene diamine inhibitor in which each alkyl group contains at least 8 carbon atoms.

10. Food product of animal origin stabilized against rancidity containing a stabilizing amount of an N,N'-di-alkyl-p-phenylene diamine inhibitor in which each alkyl group contains from about 8 to about 20 carbon atoms.

11. Fatty material of animal origin stabilized against rancidity containing a stabilizing amount of N,N'-di-alkyl-p-phenylene diamine inhibitor in which each alkyl group contains from about 8 to about 20 carbon atoms.

12. Fatty material stabilized against rancidity containing a stabilizing amounts of N,N'-di-3-(5-methylheptyl)-p-phenylene diamine.

13. Fatty material stabilized against rancidity containing a stabilizing amount of N,N'-di-4-(2,6-dimethylheptyl)-p-phenylene diamine.

14. Fatty material stabilized against rancidity containing a stabilizing amount of N,N'-di-2-decyl-p-phenylene diamine.

15. Fatty material stabilized against rancidity containing a stabilizing amount of N,N'-di-2-tridecyl-p-phenylene diamine.

16. Fatty material stabilized against rancidity containing a stabilizing amount of an N,N'-di-alkyl-p-phenylene diamine having at least 8 carbon atoms in each of its alkyl groups.

17. Lard stabilized against rancidity containing a stabilizing amount of N,N'-di-3-(5-methylheptyl)-p-phenylene diamine.

18. Lard stabilized against rancidity containing a stabilizing amount of N,N'-di-4-(2,6-dimethyl-heptyl)-p-phenylene diamine.

References Cited in the file of this patent

UNITED STATES PATENTS

| | | |
|---|---|---|
| 2,498,630 | Thompson | Feb. 28, 1950 |
| 2,513,002 | Chenicek | June 27, 1950 |
| 2,686,719 | Chenicek | Aug. 17, 1954 |